United States Patent [19]
Sawada et al.

[11] Patent Number: 5,340,959
[45] Date of Patent: Aug. 23, 1994

[54] EDM WITH AN ELECTRODE MOVED BY DEFORMATION OF AN ELECTRODE ACTUATOR

[75] Inventors: Kiyoshi Sawada, Sunto; Toshio Hirai, Oshino, both of Japan

[73] Assignee: Fanuc Ltd., Yamanashi, Japan

[21] Appl. No.: 30,056

[22] Filed: Mar. 23, 1993

[30] Foreign Application Priority Data

Jul. 26, 1991 [JP] Japan .................. 3-208815

[51] Int. Cl.[5] .................. B23H 1/04; B23H 7/30
[52] U.S. Cl. .................. 219/69.15; 219/69.2
[58] Field of Search .................. 219/69.15, 69.16, 69.2

[56] References Cited

U.S. PATENT DOCUMENTS

| | | | |
|---|---|---|---|
| 3,588,196 | 6/1971 | Bonga | 219/69.16 |
| 4,393,292 | 7/1983 | Inoue | 219/69.2 |
| 4,430,180 | 2/1984 | Shimizu | 219/69.15 |
| 4,439,659 | 3/1984 | Shimizu | 219/69.2 |

FOREIGN PATENT DOCUMENTS

| | | | |
|---|---|---|---|
| 709483 | 5/1965 | Canada | 219/69.2 |
| 2537483 | 6/1984 | France | 219/69.15 |
| 58-90427 | 5/1983 | Japan | 219/69.15 |
| 64-2830 | 1/1989 | Japan | 219/69.15 |

Primary Examiner—Geoffrey S. Evans
Attorney, Agent, or Firm—Staas & Halsey

[57] ABSTRACT

An electric discharge machine designed to prevent an impactive high-speed motion generated upon actuation of an electrode actuator from propagating to a quill, as well as to enable the rapid retreat of a tool electrode by the electrode actuator to be performed efficiently. The tool electrode is attached to a quill through an elastic supporting element and a piezoelectric actuator, with the elastic supporting element disposed on the side of the quill. The elastic supporting element has an elasticity whose degree is set so as not to adversely affect normal positioning of the tool electrode, and the piezoelectric actuator facilitates rapid retreat of the tool electrode. A support body includes a counter weight having a weight large enough to absorb the component of the impactive high-speed motion of the electrode actuator which acts toward the quill.

7 Claims, 5 Drawing Sheets

EDM WITH AN ELECTRODE MOVED BY DEFORMATION OF AN ELECTRODE ACTUATOR

BACKGROUND OF THE INVENTION

1. Field of the Invention

The present invention relates to a tool electrode driving unit of an electric discharge machine, and in particular, to a driving unit including an electrode actuator for rapidly moving the tool electrode toward and away from a workpiece.

2. Description of the Related Art

During electric discharge machining, concentration of discharge and resulting state of continuous arc discharge occurs sometimes when the clearance between the workpiece and the tool electrode has become inappropriate. Such continuous arc discharge will cause conspicuous mark to be left on the spot of the workpiece where the concentration of discharge has occurred, thereby making defective the machined surface of the workpiece. In addition, the concentrated discharges cause machining fluid to be resolved to produce pyrolysis products. As a consequence, the tool electrode and the workpiece short-circuit each other through the pyrolysis products to hinder the further progress of the machining.

In order to avoid occurrences of such situation, it is known to rapidly move the tool electrode toward and away from the workpiece to forcedly introduce the machining fluid between the workpiece and the tool electrode, thereby preventing an occurrence of concentrated discharge. More particularly, occurrence of the continuous arc discharge can be prevented by a squeeze effect of the machining fluid.

Conventionally, in order to provide a mechanism for enabling rapid retreating and approaching of the tool electrode relative to the workpiece, the tool electrode is rigidly attached to the distal end of the quill (spindle) in the electric discharge machine through a piezoelectric element, which functions as an actuator to utilize strain caused by the piezoelectric element, thereby causing a jump motion of the tool electrode to occur. However, such a motion of the tool electrode by the piezoelectric element is an impactive rapid one, that is, high-acceleration motion, so that a large impactive reaction force acts on the portions at which the tool electrode is supported. For instance, a tool electrode having a weight of 50 kg in total will cause a force of about 1200 kgf to act on the quill or column when the piezoelectric element operates. This great reaction force causes the quill or column supporting the tool electrode to be bent to absorb and consume considerable part (about 25%) of displacement generated by the piezoelectric element to pull up the tool electrode. Therefore, according to the conventional arrangement, the displacement generated by the piezoelectric element cannot be fully utilized for generating a jump motion of the tool electrode. Besides, a force caused by an impactive motion and transferred to a head or column of the electric discharge machine causes damage to feed screws, etc., thereby shortening the service life of the machine.

SUMMARY OF THE INVENTION

An object of the present invention is to provide an electric discharge machine, which prevents an impactive high-speed motion from propagating to a quill side of an electric discharge machine when an electrode actuator rapidly pulls up a tool electrode, as well as to enable the rapid retreat of the tool electrode by the electrode actuator to be performed efficiently.

To achieve the above object, according to the present invention, there is provided an electric discharge machine including a quill having a distal end portion to which a tool electrode is attached, the machine comprising: a support body to which the tool electrode is connected through an electrode actuator including constituted of an element adapted to be deformed when an external energy is applied thereto, the support body being non-rigidly connected to the quill with respect to an axial direction of the quill; and a counter weight fixed to the support body for absorbing an impact force toward the quill, the impact force being caused by a motion of the tool electrode, which is caused by deformation of the electrode actuator.

Preferably, the support body has an upper portion thereof arranged within a space formed in the distal end portion of the quill and supported by elastic supporting element mounted in the space. The support body has a lower portion thereof disposed outside the space. The lower portion is integrally formed with the counter weight, and is formed with a member for fixing the electrode actuator.

Preferably, an upper flange is formed at the upper portion of the support body, the upper flange being arranged within the space in the distal end portion of the quill, and upper and lower surfaces of the upper flange are supported by a plurality of pre-load springs mounted within the space to constitute the elastic supporting element. In addition, an oil damper is interposed between an inner wall defining the space in the distal end portion of the quill and a top surface of the upper flange.

More preferably, the element adapted to be deformed when an external energy is applied thereto has a reverse piezoelectric effect, electric strain effect, or magnetic strain effect. Alternatively, the element may be made of a shape memory alloy.

As mentioned above, according to the present invention, when the electrode actuator operates, the counter weight having a considerable large weight is kept at a functionally fixed point, though a great external force caused by deformation of the actuator acts on the electrode, whereby the quill or column is prevented from being deformed. Moreover, the deformation occurs in the direction toward the electrode, so that the action caused by the electrode actuator can be fully utilized for the jumping motion of the tool electrode, whereby the continuous arc discharge can surely be prevented by a squeeze effect of the machining fluid. Thus, keeping the quill or column of the electric discharge machine from the effect of the deforming force will contribute to the improvement in machining accuracy and a longer machine life.

DETAILED DESCRIPTION OF THE PREFERRED EMBODIMENTS

Figure 1:
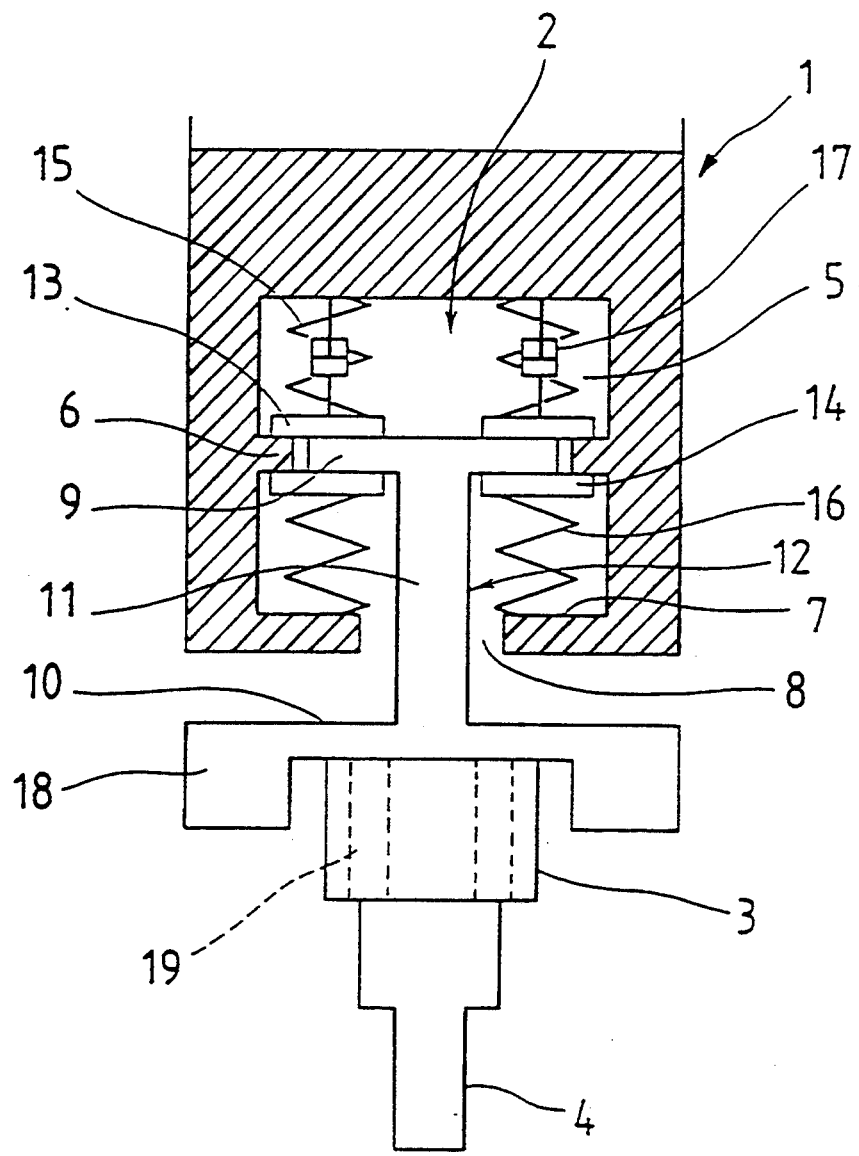
FIG. 1 is a front view schematically showing a main part of a machine according to an embodiment of the present invention.

FIG. 1 shows a first embodiment. A tool electrode 4 is attached to a distal end portion of a quill 1 of an electric discharge machine. A space 5 having a circular section is defined in the distal end portion of the quill 1, as shown in the drawing. The space 5 is partitioned vertically by a circumferential flange 6 which projects in a horizontal direction from an intermediate portion of an inner wall which defines the space 5. Further, a through hole 8 is formed at a bottom wall 7 of the quill 1, and a piston 11 of a support body 12, which will be described later, extends therethrough. The whole of the support body 12 is made of stainless steel, and comprises a cylindrical piston 11, which extends vertically, and disk-like upper and lower flanges 9 and 10, which are integrally formed with upper and lower end portions of the piston 11, respectively. Further, an upper half of the support body 12 is received in the space 5 of the quill 1, while a lower half thereof is disposed outside the space, and an electrode actuator 3 is attached to the lower flange 10, as shown in FIG. 1. The tool electrode 4 is rigidly fixed to the electrode actuator 3.

The upper half of the support body 12 received in the space 5 of the quill is supported by elastic supporting means 2 arranged in the space 5 at a position where an outer side surface of the upper flange 9 of the support body 12 is opposing an inner side surface of the flange 6 which projects from the inner wall defining the space 5. That is, the support body 12 is not directly connected to the quill 1 but non-rigidly connected thereto through the elastic supporting element 2. However, the tool electrode 4, which is fixed to the lower flange 10 of the support body 12 through the electrode actuator 3, is designed so that it can be ordinarily controlled to a command position by perfectly corresponding with movement of the quill 1 during machining.

The elastic supporting element 2 comprises a plurality of springs 15 and 16, which are fixed to the top inside surface and bottom inside surface of the wall, oil dampers 17, and pressure bars 13 and 14. The thickness of the upper flange 9 of the support body is the same as that of the circumferential flange 6 on the quill side. The upper and lower surfaces of the upper flange 9 are urged downward and upward respectively by the force of a plurality of springs 15 and 16 applied, through pressure bars 13 and 14, from one end of the springs 15 and 16 of which the other ends are fixed respectively to the top inside surface and the bottom inside surface of the wall defining the space 5. That is, the springs 15 and 16 function as preload springs for the support body 12. Further, the oil dampers 17 together with spring 15 are interposed between the top inside surface of the wall and the upper surface of the upper flange 9 through the pressure bars 13.

The support body 12 is supported by the elastic supporting element 2 constructed as mentioned above, and hence movement of the quill 1 is restricted by the upper or lower springs 15 or 16 when the support body attempts to move in the upper or lower direction. Further, when the quill 1 of the electric discharge machine is moved in the vertical direction to control the position of the tool electrode 4, the support body 12 (and hence the tool electrode 4) perfectly follows the movement of the quill. That is, the springs 15 and 16, and oil dampers 17 constitute the elastic supporting element 2, and support the support body 12 in a non-rigid manner.

The lower flange 10 of the support body 12 has a peripheral edge with wall thickness increased to form an annular counter weight 18. Due to the provision of this counter weight 18, the support body 12 has a mass (weight) of about three times as much as the total weight (normally 100 kg or below) of the electrode actuator 3 and tool electrode 4.

In this embodiment, the electrode actuator 3 for causing a jump motion of the tool electrode 4 comprises a piezoelectric element. The piezoelectric element used here is an ordinary type comprising a plurality of blocks 19 of ceramic pellets made of titanic acid barium crystal piled in several layers, are interposed between base and operating plates, and these plates are arranged vertically so that expansion and contraction of the element due to piezo effect is performed in the vertical direction. The piezoelectric element or electrode actuator 3 is fixed to the center portion of the lower surface of the lower flange 10 in the supporting body 12.

Operation of the electrode actuator 3 is controlled by means of an NC unit included in the electric discharge machine. The NC unit has a function of driving the electrode actuator 3 when it detects continuous arc discharges. More specifically, in the present embodiment, the piezoelectric element of the electrode actuator 3 is kept deformed or elongated as long as it is energized, but, when the power supply is interrupted, it will contract to cause the rapid retreat of the tool electrode.

The tool electrode 4 is formed for diemilling, and is rigidly fixed to the lower surface of the electrode actuator 3.

When continuous arc discharge is detected during the electric discharge machining using the tool electrode 4, power supply to the electrode actuator 3 will be interrupted according to a command supplied from the NC unit which has received the detection signal. At this moment, the piezoelectric element will contract instantaneously to cause the tool electrode 4 to be pulled up rapidly (by about 30 microns). This will cause a clearance between the workpiece and tool electrode to be increased instantaneously, so that machining fluid moves in and out of the clearance at a high speed, and then the continuous arc discharge is interrupted by the squeeze effect mentioned above. Such contraction of the piezoelectric element occurs as an impulsive high-speed motion to last about 500 micro seconds, so that a great force, as a reaction force to pull up the tool electrode 4, will be applied on the side of the support body 12.

However, since the support body 12, rigidly supporting the tool electrode 4, has a small natural frequency and a great inertia due to the provision of the counter weight 18, the supporting body 12 is kept at a fixed point while an acting force generated upon contraction of the piezoelectric element is exerted on the side of the electrode. Therefore, the reaction force is absorbed by the counter weight 18, whereby an impact to the quill 1 can be prevented. Moreover, the high-frequency impactive high-speed motion, caused by the contraction of the piezoelectric element, is exerted in a manner such that the support body 12 functionally serves as a fixed point, and this motion substantially acts on the side of the electrode, so that most of this motion can be used for pulling up the tool electrode 4.

However, the movement of the electric actuator 3 includes components other than the aforesaid impactive high-speed motion such as the longitudinal vibration or the like occurring in the tool electrode 4 or the support body 12. Since such a motion cannot be absorbed fully by the counter weight 18, vibration occurs in the support body 12 after the tool electrode 4 is rapidly pulled up by the piezoelectric element. However, the vibration is absorbed and buffed by the springs 15 and 16, which urge the upper and lower surfaces of the upper flange 9 in the support body 12, and is rapidly damped by the oil dampers 17. Therefore, the support body 12 does not actually vibrate, and thus no deformation occurs in the quill 1.

Figure 2:
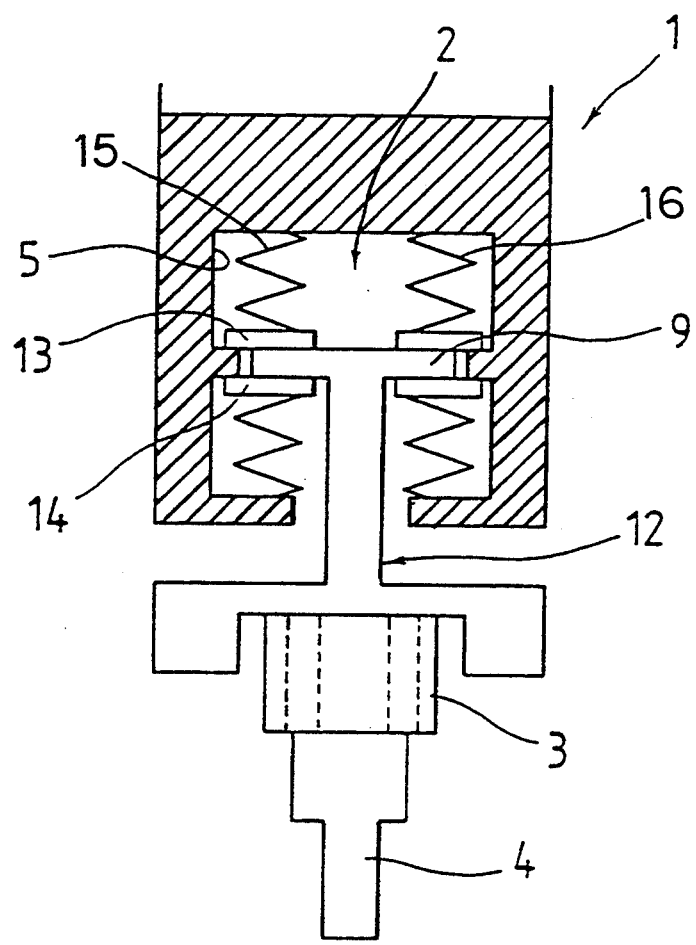
FIGS. 2 to 5 are enlarged views schematically showing examples of various modification of the elastic supporting means shown in the aforesaid embodiment.

FIG. 2 shows a second embodiment. In the first embodiment, the elastic supporting element 2 comprises the springs 15 and 16, oil dampers 17 and the like. As shown in FIG. 2, the elastic supporting element includes springs 15 and 16, but the oil dampers 17 among these components can be omitted, if inertias (moving energy) of the tool electrode 4 and support body 12 are sufficiently absorbed by the springs 15 and 16. Furthermore, the piston 11 of the support body 12 may be constituted non-rigidly to dispense with the springs 15 and 16.

Figure 3:
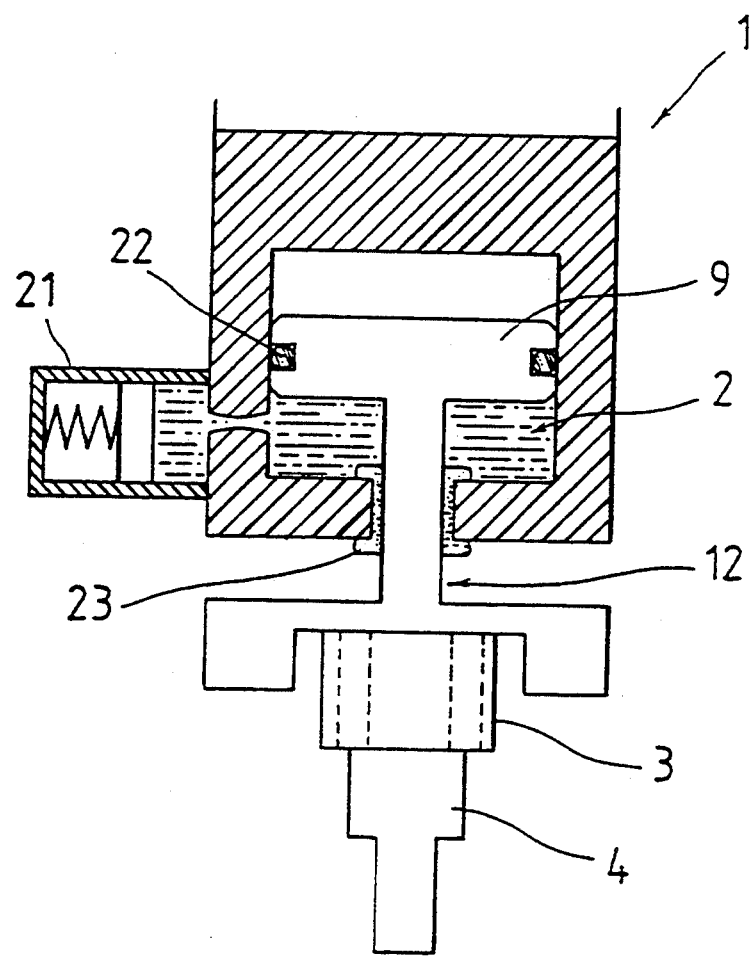

FIG. 3 shows a third embodiment. According to this embodiment, the space delimited by the upper portion of the support body 12 and the bottom of the flange 9 within the space 5 in the distal end portion of the quill 1 is filled with a fluid and is made to communicate with an accumulator 21. The accumulator pressure is adjusted so as to be balanced with the weight of the support body 12. Oil seal 22 is provided between the circumference of the upper flange 9 and the inner surface of the wall defining the space 5, while oil seal 23 is provided between the piston 11 and the circumference of the bottom wall 7. Thus, the support body 12 can be elastically supported by the fluid pressure. In this case, the fluid performs functions equivalent to those of the springs 15 and 16 and dampers 17.

Figure 4:
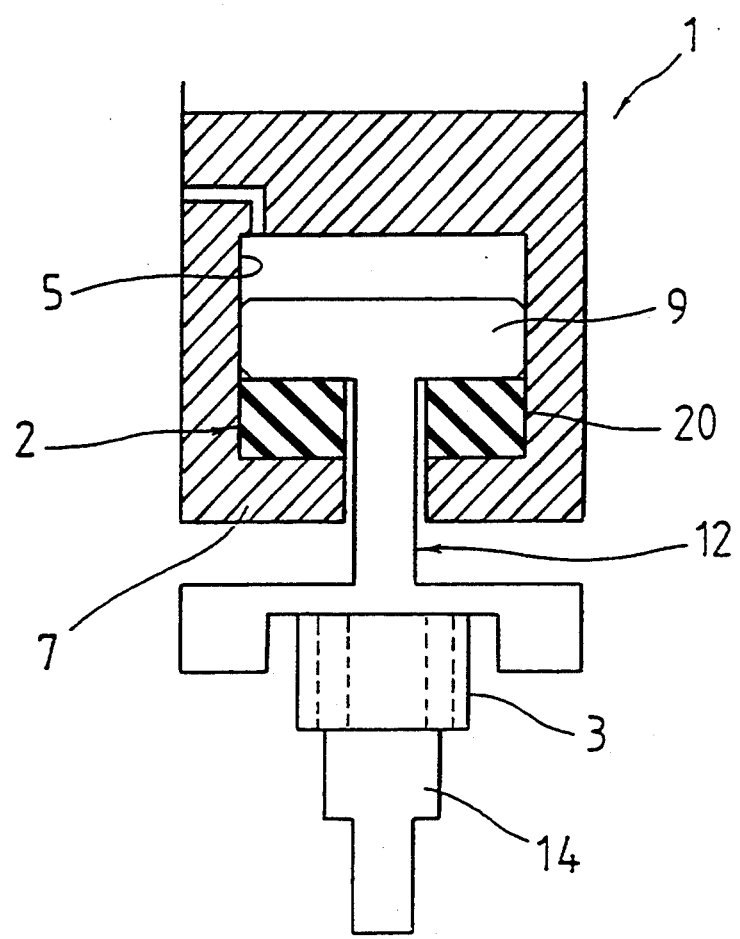

FIG. 4 shows a fourth embodiment. In this embodiment, the upper flange 9 of the support body 12 is freely movable in the vertical direction in the space 5 of the distal end portion of the quill, and is supported by an elastic member 20 interposed between the upper flange and the bottom wall 7. The elastic member 20 has an elasticity whose degree is set so as not to hinder the positioning of the tool electrode 4. More specifically, the tool electrode 4 is arranged to be hanged down from the quill 1 in the axial direction, however, the support body 12 has a weight that is large enough for the positioning of the tool electrode 4.

Therefore, according to the fourth embodiment, a downward component of vibration caused by the motion of the electrode actuator 3 is absorbed and damped by the elastic member 20. On the other hand, an upward component of the vibration is not subject to the damping effect, so that this component will not give any adverse effect on the machining operation, though it sometimes causes the support body 12 to bounce upward. Furthermore, this embodiment enables the structure of the elastic supporting means to be simplified.

Figure 5:
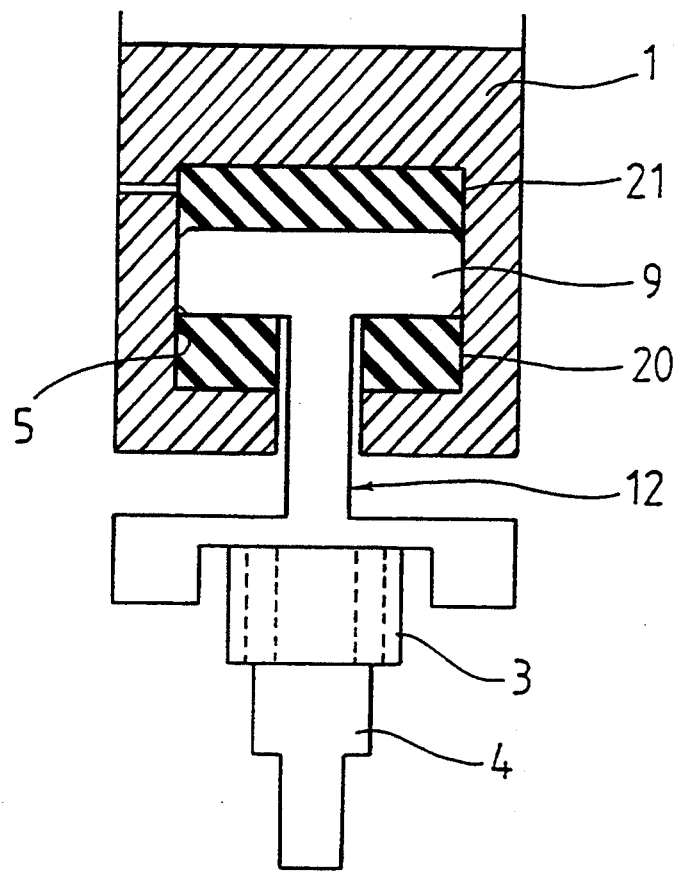

FIG. 5 shows a fifth embodiment. In this embodiment, elastic members 21 and 20 respectively fill the spaces both above and below the upper flange 9, which is arranged in the space 5 of the distal end portion of the quill 1 unlike the case of the fourth embodiment, to absorb and dump the vibration of the support body 12 caused by deformation of the electrode actuator 3. Furthermore, according to this embodiment, not only the structure of the elastic supporting element 2 can be made simpler but also the tool electrode 4 can be supported more stably compared with the fourth embodiment.

In addition, the electrode actuator 3 is not restricted to an element of a type providing reverse piezoelectric effect or electric strain effect, and may be of any type of element, such as magnetic strain effect element and shape memory alloy, which causes rapid physical deformation when an external energy of some kind is applied.

We claim:

1. An electric discharge machine including a quill having a distal end portion to which a tool electrode is attached, comprising:

a support body to which the tool electrode is connected through an electrode actuator including an element adapted to be deformed when an external energy is applied thereto, said support body being nonrigidly connected to the quill at an axial direction of the quill; and a counter weight, integrally formed with said support body, for absorbing an impact force toward the quill, the impact force being caused by a motion of the tool electrode which is in turn caused by deformation of the electrode actuator.

2. An electric discharge machine according to claim 1, wherein said support body has an upper portion arranged within a space formed at the distal end portion of the quill and supported by an elastic supporting element mounted in said space, and has a lower portion positioned outside said space, said lower portion being integrally formed with said counter weight and being formed with a member for fixing said electrode actuator.

3. An electric discharge machine according to claim 2, wherein an upper flange is formed at said upper portion of said support body, said upper flange being arranged within said space at the distal end portion of the quill, upper and lower surfaces of said upper flange being supported by a plurality of pre-load springs mounted within said space to comprise said elastic supporting element.

4. An electric discharge machine according to claim 3, wherein said elastic supporting element includes an oil damper which is interposed between an inner surface of the wall defining said space in the distal end portion of the quill and a top surface of said upper flange.

5. An electric discharge machine according to claim 1, wherein said element adapted to be deformed when an external energy is applied thereto has a reverse piezoelectric effect or an electric strain effect.

6. An electric discharge machine according to claim 1, wherein said element adapted to be deformed when an external energy is applied thereto has a magnetic strain effect.

7. An electric discharge machine according to claim 1, wherein said element adapted to be deformed when an external energy is applied thereto is made of a shape memory alloy.

* * * * *

UNITED STATES PATENT AND TRADEMARK OFFICE
CERTIFICATE OF CORRECTION

PATENT NO. : 5,340,959
DATED : August 23, 1994
INVENTOR(S) : Kiyoshi SAWADA et al.

It is certified that error appears in the above-indentified patent and that said Letters Patent is hereby corrected as shown below:

On the title page, item [30], insert --

July 27, 1992  PCT/JP92/00953--.

IN THE DRAWINGS

Fig. 4, delete "14" and insert --4--.

Column 2, lines 8 and 9, delete "constituted of".

Signed and Sealed this

Twenty-seventh Day of December, 1994

Attest:

BRUCE LEHMAN

*Attesting Officer*    *Commissioner of Patents and Trademarks*